May 10, 1966 W. L. DENHAM 3,251,015
MINIATURE MAGNETIC CORE AND COMPONENT ASSEMBLIES
Filed May 20, 1964
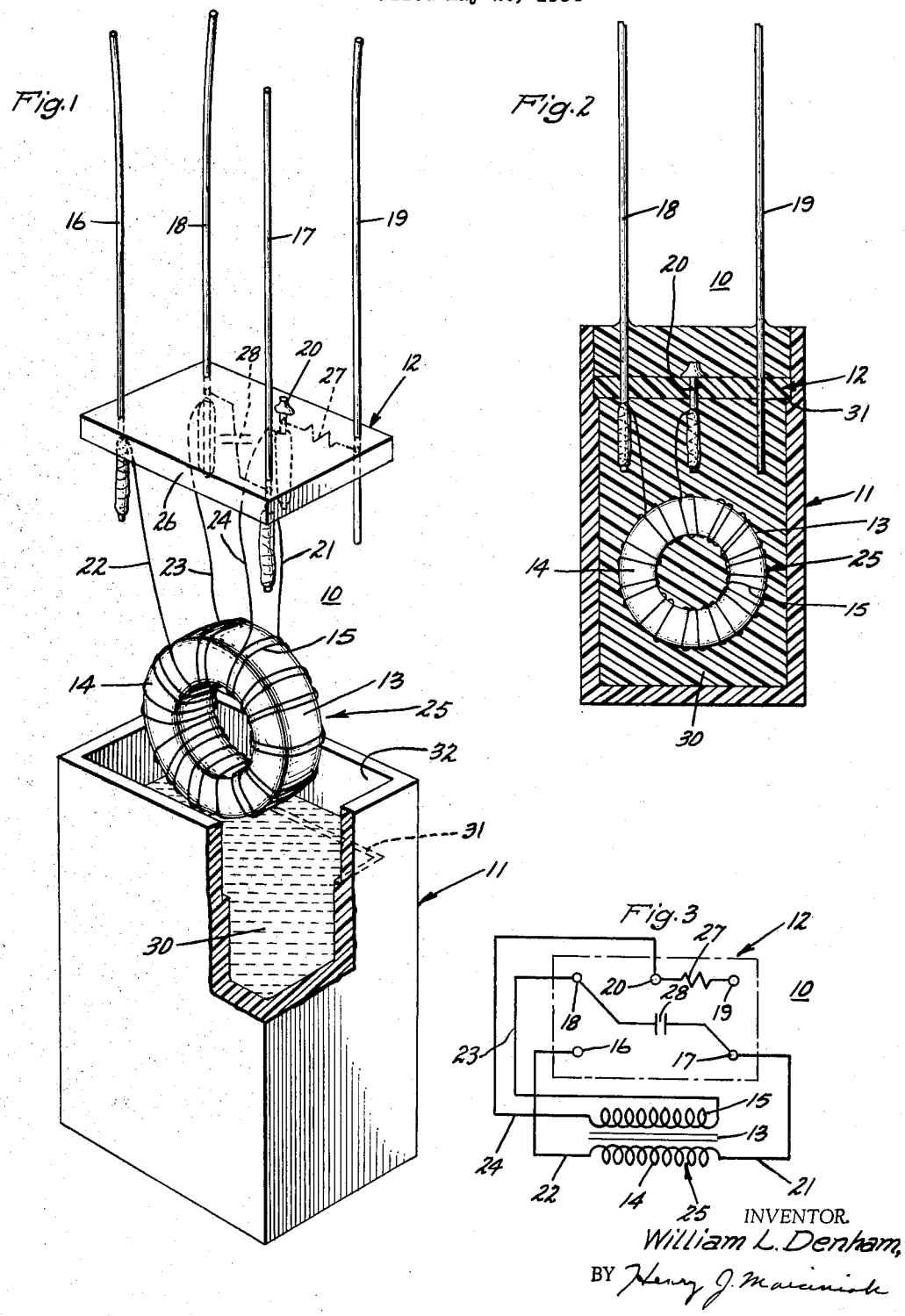
INVENTOR.
William L. Denham,
BY Henry J. Marciniak
Attorney.

United States Patent Office 3,251,015
Patented May 10, 1966

3,251,015
MINIATURE MAGNETIC CORE AND COMPONENT ASSEMBLIES
William L. Denham, Fort Wayne, Ind., assignor to General Electric Company, a corporation of New York
Filed May 20, 1964, Ser. No. 368,875
6 Claims. (Cl. 336—96)

This invention relates generally to electrical component assemblies and more particularly to a magnetic core and component assembly of the miniature type.

In electronic applications, such as computers, there is a need for miniature electrical assemblies that can be economically produced. Toroidal type of magnetic cores are commonly used in computer applications. Typical magnetic cores are smaller in size than a dime and are wound with relatively fine wire. To prevent damage to the winding leads and the magnetic core during handling prior to installation and after the assembly has been installed, it is desirable, if not necessary, that the assembly be encased in suitable encapsulating material such as a thermosetting resin. In some applications it is required that a predetermined amount of resistance and capacitance be provided by the windings which are inductively coupled on the magnetic core.

Heretofore, various problems have been encountered in the fabrication and design of such miniature assemblies. Conventionally, electrical components associated with windings of the magnetic core are connected externally and separately from the magnetic core and coil assembly. Such an arrangement, of course, complicates the assembly procedures. In some instances, the desired resistance may be obtained by adjusting the wire size or type of conductive material used in the winding. In many cases, it may not be practicable to provide the desired amount of resistance by this technique. Because of the small size of the miniature cores, conventional methods for encapsulating transformers are not readily adaptable to such miniature cores. Thus, there is a need for a simplified assembly arrangement for a magnetic core and its associated electrical components wherein the assembly and encapsulation or potting of the magnetic core are greatly simplified.

Accordingly, a general object of the present invention is to provide an improved miniature magnetic core and component assembly.

Another object of the present invention is to provide an improved miniature magnetic core and component assembly wherein a predetermined amount of resistance and capacitance can be provided by the assembly.

It is a specific object of the invention to provide a miniature magnetic core and component assembly so constructed and arranged so as to facilitate the production of the assemblies in mass quantities.

According to one form of my invention I have provided an improved magnetic core and component assembly wherein a base member serves as one of the walls of an enclosure for a magnetic core. The base member has formed integrally therewith a plurality of electrical components. The electrical components may be deposited or printed on the base member and are joined in electrical circuit with conductor pins that extend from the base member to provide terminals for making electrical connections.

In the illustrated exemplification of the invention the base member forms the sixth wall of a box-shaped plastic case element. Preferably, the case element is formed with a shoulder near the opening so that when the base member rests against the shoulder the magnetic core is positioned within the enclosure formed by the case element and the base member. A suitable potting or encapsulating material, such an epoxy resin, fills the enclosure to thereby encase the magnetic core and provide a unitary miniature magnetic core and component assembly.

An advantage resulting from the improved arrangement is that the electrical connections between the fine wire leads of the miniature magnetic core can be readily effected with other electrical components and with the terminals provided for making external circuit connections. Also, the improved assembly arrangement is readily adaptable to mass production techniques.

The subject matter which I regard as my invention is particularly pointed out and distinctly claimed in the concluding portion of this specification. My invention, itself, however, both as to organization and method of operation together with further objects and advantages thereof may be best understood by reference to the following description taken in conjunction with the accompanying figures in which:

FIGURE 1 is an exploded perspective view of a miniature magnetic core and component assembly embodying one form of the invention wherein the components are shown prior to encapsulation or potting;

FIGURE 2 is a sectional view of the miniature magnetic core and component assembly taken along three aligned conductor pins and showing the improved assembly after encapsulation; and FIGURE 3 is a schematic circuit diagram of the miniature magnetic core and component assembly shown in FIGURES 1 and 2, the base member being shown in dot-dash lines.

Having more specific reference now to FIGURES 1 and 2 of the drawings, I will now more fully describe the structural features of the illustrated magnetic core and component assembly which is generally identified by the numeral 10. A two-part enclosure comprised of a case element 11 and a base member 12 is provided for a torodial or ring core 13.

The toroidal core 13 used in the illustrated embodiment of the invention has wound thereon two inductively coupled windings 14, 15 of insulated magnet wire, which serve as the primary and the secondary windings 14, 15 of a transformer 25. A plurality of conductor pins 16, 17, 18, 19 and 20 are rigidly fixed to the base member 12 and extend therefrom to provide terminals for making electrical connections. The start and finish leads 21 and 22 of the primary winding 14 are connected with conductor pins 17 and 16, while the start and fiinish leads 23 and 24 of the secondary winding 15 are joined with connector pins 18 and 20. In the exemplification of the invention, five conductor pins are shown. Only four conductor pins 16, 17, 18 and 19 extend through the base member 12 to provide terminals for connecting the magnetic core and component assembly 10 in an external circuit. It will be apparent, however, that any number of conductor pins may be provided, the number depending on the specific circuit connections required for the electrical components used in a given applicaiton.

In the illustrated embodiment of the invention, the base member 12 includes a ceramic substrate 26 on which a resistor 27 and a capacitor 28 are deposited to provide a predetermined amount of resistance and capacitance in the transformer circuit. The deposited capacitor 28 is connected between the conductor pins 17 and 18 and the deposited resistor 27 is connected in series between conductor pins 19 and 20. Although in the illustrated embodiment of the invention only one deposited resistor and capacitor are used, it will be understood that additional electrical components may be included as may be required. Also, the components may be formed integrally with the base member by other known techniques, such as by printing. Further, it will be appreciated that other types of magnetic cores, such as a cup core, may be used in the practice of the invention.

As will be seen in FIGURE 1, the magnetic core 13 is initially preassembled with the base member 12 by soldering the leads 21, 22, 23, 24 to the conductor pins 17, 16, 18 and 20 respectively. In order to pot or encapsulate the magnetic core 13, the assembly consisting of the magnetic core 13 and base member 12 is lowered into the case element 11, which contains a liquid potting or encapsulating material 30, each as an epoxy resin. It will be noted that a shoulder 31 is formed at the inside walls of the case element 11 near an aperture 32 adapted for receiving the magnetic core 13. When the base member 12 rests against the shoulder 31, the wound toroidal core 13 is positioned within the case element 11. After the base member 12 is lowered into the liquid potting material 30, some of the material seeps over the base member 12 to form a layer on top of the base member 12. When the overflow of resin material is cured, the base member 12 is effectively sealed within the case element 11, and a completely encased core and component assembly 10 is provided.

Although the potting material used in the exemplification of the invention was a thermosetting epoxy resin, it will be appreciated that other resins and suitable potting or encapsulating materials may be used. The case element 11 in the illustrated exemplification of the invention was molded from an aromatic polycarbonate resin. When the resin potting material 30 hardens, it forms a bond with the polycarbonate resin case element 11 and provides a rigid unitary assembly 10, which is essentially impervious to moisture.

Having more specific reference now to the schematic circuit diagram shown in FIGURE 3, I will now more fully describe the electrical connections of the primary and secondary windings 14 and 15 with the resistor 27 and capacitor 28 formed integrally with the base member 12. It will be seen that the start and finish leads 21, 22 of the primary winding 14 are connected to the conductor pins 17 and 16 respectively and the start and finish leads 23 and 24 of the secondary winding 15 are connected in circuit with conductor pins 18 and 20. It will be noted that the capacitor 28 is connected across the conductor pins 17, 18 so that one end of the primary winding 14 is capacitively coupled with one end of the secondary winding 15. The electrical connections of the deposited resistor 27 across the conductor pins 19 and 20 place the resistor 27 in series circuit relation with the secondary winding 24. Although a specific circuit configuration is shown in the illustrated exemplification of the invention, it will be understood that the circuit components may be variously connected as may be required in particular applications.

From the foregoing description it will be apparent that the invention provides an improved structural arrangement for a magnetic core and component assembly that is particularly adapted for use in miniature core assemblies. In accordance with the invention the base member 12 serves as the sixth wall of an enclosure encasing the toroidal magnetic core and serves to position the core in the enclosure during encapsulation thereby to provide a rigid unitary structure after the resin potting material is cured. It also incorporates the additional circuit elements. Further, it will be apparent that the improved magnetic core and component assembly is readily adaptable for use in semiautomated production lines.

While I have shown and described a particular embodiment of the invention, it will be apparent that changes and modifications may be made to the disclosed structure without departing from the invention. It is, therefore, intended in the appended claims to cover all such changes and modifications as fall within the true spirit and scope of my invention.

What I claim as new and desire to secure by Letters Patent of the United States is:

1. A miniature magnetic core and component assembly comprising: a base member formed of dielectric nonmagnetic material, a plurality of conductor pins extending through said base member to provide terminals for making electrical connections, a capacitor and a resistor formed integrally with said base member and electrically connected in a circuit with a number of said conductor pins, a toroidal magnetic core, at least one winding wound on said core and joined in electrical circuit with at least a pair of said conductor pins, a plastic case element having an aperture formed therein for receiving said magnetic core, said base member being positioned in and closing said aperture to provide in conjunction with said case element an enclosure for said magnetic core, and potting means disposed within said enclosure formed by said case element and said base member and encasing said toroidal magnetic core.

2. The miniature magnetic core and component assembly set forth in Claim 1 wherein said case element is formed with internal shoulder means near said aperture, said base member resting against said shoulder means to position said magnetic core within said enclosure during potting.

3. A miniature magnetic core and component assembly comprising: a base member formed of dielectric nonmagnetic material and having a plurality of conductor pins extending therethrough to provide terminals for making electrical connections, a plurality of electrical components formed integrally with said base member and connected electrically in circuit with a number of said conductor pins, a magnetic core, a primary and a secondary winding inductively coupled on said magnetic core and connected in electrical circuit with some of said plurality of conductor pins, a case element having an aperture for receiving said magnetic core, said base member being positioned in and covering said aperture to form in conjunction with said case element an enclosure for said magnetic core, and potting material substantially filling the enclosure formed by said base member and case element thereby to encapsulate said magnetic core.

4. The miniature magnetic core and component assembly set forth in claim 3 wherein a means is provided on said case element near said aperture to position said base member with respect to said case element and thereby position the magnetic core within the enclosure formed by said base member and case element.

5. A miniature magnetic core and component assembly comprising a rectangular base member formed of dielectrical nonmagnetic material and having a plurality of conductor pins extending therethrough to provide terminals for making electrical connections, a plurality of electrical components formed integrally with said base member and connected electrically in circuit with a number of said conductor pins, a magnetic core, at least a pair of windings inductively coupled on said magnetic core and having leads connected to a number of said conductor pins, a case element formed of electrically insulating material and having a rectangular aperture for receiving said magnetic core, said magnetic core being disposed within said case element, and said case element and said base member forming an enclosure for said magnetic core, and potting material filling at least said enclosure and encapsulating said magnetic core.

6. The miniature magnetic core and component assembly set forth in claim 5 wherein said base member is comprised of a ceramic substrate and said electrical components are deposited on said substrate.

References Cited by the Examiner
UNITED STATES PATENTS

| | | |
|---|---|---|
| 1,702,159 | 2/1929 | Grunow. |
| 2,731,607 | 1/1956 | Gould et al. _____ 336—96 |
| 2,773,158 | 12/1956 | Myers _____ 174—52.6 X |
| 2,862,992 | 12/1958 | Franz _____ 264—272 X |

ROBERT K. SCHAEFER, *Primary Examiner.*

JOHN F. BURNS, *Examiner.*

D. J. BADER, *Assistant Examiner.*